US007948131B2

(12) United States Patent
Nakashima et al.

(10) Patent No.: US 7,948,131 B2
(45) Date of Patent: May 24, 2011

(54) SUPERCONDUCTING MAGNETIC THRUST BEARING WITH INTEGRATED DYNAMOTOR

(75) Inventors: Hiroshi Nakashima, Nagoya (JP);
Michiaki Kubota, Nagoya (JP);
Hideyuki Yamada, Nagoya (JP);
Kazunori Kikukawa, Nagoya (JP);
Madoka Fujii, Nagoya (JP)

(73) Assignee: Central Japan Railway Company, Nagoya-Shi (JP)

( * ) Notice: Subject to any disclaimer, the term of this patent is extended or adjusted under 35 U.S.C. 154(b) by 162 days.

(21) Appl. No.: 12/521,150

(22) PCT Filed: Dec. 21, 2007

(86) PCT No.: PCT/JP2007/074754
§ 371 (c)(1),
(2), (4) Date: Jun. 25, 2009

(87) PCT Pub. No.: WO2008/078718
PCT Pub. Date: Jul. 3, 2008

(65) Prior Publication Data
US 2010/0026121 A1 Feb. 4, 2010

(30) Foreign Application Priority Data

Dec. 25, 2006 (JP) ................. 2006-348263

(51) Int. Cl.
*H02K 7/09* (2006.01)
*F16C 32/04* (2006.01)
(52) U.S. Cl. ........................................ 310/90.5
(58) Field of Classification Search .......... 310/90.5, 310/261.1, 254.1; *H02K 7/09; F16C 32/04*
See application file for complete search history.

(56) References Cited

U.S. PATENT DOCUMENTS 5,159,219 A * 10/1992 Chu et al. ............... 310/90.5
(Continued)

FOREIGN PATENT DOCUMENTS

JP 02163513 A * 6/1990
(Continued)

OTHER PUBLICATIONS

International Search Report dated Feb. 12, 2008 issued in related International Patent Application No. PCT/JP2007/074754.
(Continued)

*Primary Examiner* — Tran N Nguyen
(74) *Attorney, Agent, or Firm* — Grossman, Tucker, Perreault & Pfleger, PLLC (57) ABSTRACT

In a superconducting magnetic thrust bearing with integrated dynamotor, a first fixed core is formed to have a U-shaped cross-section in a direction of the central axis of the cylindrical shape with an opening of the U-shape being directed perpendicularly to the central axis, and a superconducting coil is arranged on the inside of the U-shaped portion of the first fixed core formed into the U-shape. A rotary core has projecting ends at positions opposite to two projecting ends of the U-shape of the first fixed core, and a magnetic flux guide path, at a position opposite to an armature core, with a shape varying at predetermined intervals in the winding direction of the superconducting coil. The rotary core is constituted such that it rotates relatively to the first fixed core and is able to move in the direction of the central axis of the first fixed core. The armature core is arranged fixedly in a magnetic flux path that introduces a magnetic flux, which is generated from the superconducting coil and led out from one of the two projecting ends of the U-shape of the first fixed core, to the projecting ends of the rotary core, and leads out the magnetic flux from the projecting ends of the rotary core.

10 Claims, 4 Drawing Sheets

U.S. PATENT DOCUMENTS 6,856,062 B2 * 2/2005 Heiberger et al. ............ 310/178

FOREIGN PATENT DOCUMENTS

| JP | 07098016 | 4/1995 |
| JP | 2001343020 | 12/2001 |
| JP | 2004331241 | 11/2004 |
| JP | 2006153261 | 6/2006 |
| JP | 2008304045 A * | 12/2008 |

OTHER PUBLICATIONS

International Preliminary Report on Patentability dated Jun. 30, 2009 in connection with International Patent Application No. PCT/JP2007/074754.

* cited by examiner

SUPERCONDUCTING MAGNETIC THRUST BEARING WITH INTEGRATED DYNAMOTOR

TECHNICAL FIELD

The present invention relates to a technology of integrating a magnetic thrust bearing and a dynamotor into a simplified structure using a superconducting coil.

BACKGROUND ART

Since a magnetic thrust bearing using a superconducting coil can bear high thrust force, an application to a bearing of a large-scaled flywheel for storing energy, for example, is being made. In order to store the energy in the flywheel, a dynamotor is necessarily required to rotate the flywheel or to extract the rotating energy of the flywheel as electric energy.

Conventionally, the dynamotor is separately mounted from the magnetic thrust bearing using the superconducting coil and is operated with a rotation axis thereof being directly connected to a rotation axis of the flywheel.

In particular, with a flywheel for which rotation loss is necessarily reduced, a rotor is sometimes received in vacuum, so that it is difficult to adopt an equipment having heat generation to the rotor. Hence, it is difficult to use an inexpensive inductive type dynamotor having a simple structure and it is required to use a synchronous type dynamotor using a permanent magnet (for example, refer to Patent Literature 1).
Patent Literature 1: Japanese Unexamined Patent Publication No. 2001-343020

DISCLOSURE OF THE INVENTION

Problems to be Solved by the Invention

In the technology using the synchronous type dynamotor, an overall structure of an energy storage apparatus using the flywheel is complicated and the cost thereof is high. Furthermore, many dynamotors use the permanent magnet in a field, and the large-scaled dynamotor causes the assembly thereof to be difficult and the cost to be increased.

In addition, from a point of view of a dynamotor, when a thrust bearing is required in the conventional equipment, the bearing is in general provided separately from the dynamotor. This as a result causes the structure to be complicated and the cost to be increased.

The present invention has been made to solve the above problems and an object thereof is to provide a superconducting magnetic thrust bearing with integrated dynamotor having a simple structure.

Means to Solve the Problems

In order to solve the problems, according to a first aspect of the present invention, there is provided a superconducting magnetic thrust bearing with integrated dynamotor including a superconducting coil, a first fixed coil, a rotary core and armature cores.

The first fixed core is arranged so that a central axis thereof coincides with that of the superconducting coil, and is formed to have a U-shaped cross-section in a direction of a central axis of a cylindrical shape with an opening of the U-shape being directed perpendicularly to the central axis.

The rotary core is formed into a cylindrical shape and is arranged on the inside or outside of the first fixed core so that a central axis thereof coincides with that of the superconducting coil. In addition, the rotary core has projecting ends at positions opposite to two projecting ends of the first fixed core, and a plurality of magnetic flux guide paths formed at a predetermined interval in a winding direction of the superconducting coil.

The rotary core is constituted in such a way that it rotates relatively to the first fixed core and can move in the direction of the central axis of the first fixed core.

The armature core has armature coils and is arranged in a plural number in the winding direction of the superconducting coil. In addition, the armature cores are arranged in a magnetic flux path that introduces a magnetic flux, which is generated from the superconducting coil and led out from one of the two projecting ends of the U-shape of the first fixed core, to the projecting ends and the magnetic flux guide paths of the rotary core, and returns to the other projecting end via the projecting ends and the magnetic flux guide paths of the rotary core.

The superconducting coil is arranged in the inside of the U-shaped portion of the first fixed core formed into the U-shape.

With the superconducting magnetic thrust bearing with integrated dynamotor, the magnetic flux generated from the superconducting coil passes through the magnetic path formed by the first fixed core of U-shape and is led out from the one of the two projecting ends of U-shape to the outside.

The magnetic flux, which is led out from the one of the two projecting ends of the first fixed core to the outside, is introduced at a position opposite to the one projecting end to the projecting end and the magnetic flux guide path of the rotary core.

The magnetic flux, which is introduced to the projecting end and the magnetic flux guide path of the rotary core, passes through the cylindrical portion of the rotary core to a position opposite to the other projecting end of the two projecting ends of the first fixed core, is led out, at the position opposite to the other projecting end of the two projecting ends of the first fixed core, from the projecting end and the magnetic flux guide path of the rotary core to the outside, and is introduced to the other projecting end of the twp projecting ends of the first fixed core.

By doing so, there is formed a magnetic path that guides the magnetic flux generated from the superconducting coil between the first fixed core and the rotary core.

In addition, the armature cores have a plurality of armature coils arranged in the winding direction of the superconducting coil, and are arranged at the positions of introducing the magnetic flux led out from the first fixed core to the rotary core and introducing the magnetic flux led out from the rotary core to the first fixed core, i.e., in the middle of the magnetic path formed by the first fixed core and the rotary core.

Since the magnetic flux density to be introduced/led out is increased at a position at which the magnetic flux guide path provided to the rotary core and having a shape varying at predetermined intervals is opposite to the first fixed core, an amount of the magnetic flux passing through the armature cores is changed as the rotary core rotates.

Accordingly, when the current is supplied to the armature core while meeting a rotating position of the rotary core, the present invention can be used as an electric motor, and when the current is extracted from the armature core, the present invention can be used as an electric generator.

Furthermore, when force is applied in a direction of the central axis of the rotary core, i.e., in a thrust direction, a slight offset occurs to the rotary core in the direction of the central axis. Since a magnetic resistance is generated in the magnetic path by the "offset", there occurs force that returns the rotary core in a direction opposite to the applied force so as to reduce the resistance. Accordingly, the present invention also functions as a magnetic thrust bearing.

At this time, since the superconducting coil is used as a generation source of the magnetic flux, it is possible to generate a very strong magnetic flux. In addition, by mounting the armature coils, it is possible to commonly use a coil for a thrust bearing of a flywheel as a generation source of a field of a dynamotor and it is not necessary to further mount a rotor, contrary to the prior art.

In addition, in a dynamotor in which thrust force is generated, it is possible to constitute a strong non-contact thrust support apparatus by using a coil forming a field.

Like this, the superconducting coil, the first fixed core, the rotary core and the armature core are integrated, so that it is possible to realize a superconducting magnetic thrust bearing with integrated dynamotor in which a dynamotor and a magnetic thrust bearing are integrated in a simplified structure.

In the meantime, the description that the magnetic flux guide path has "a shape varying at predetermined intervals" means that the magnetic flux guide path has convex portions at predetermined intervals or has a concavo-convex shape having a predetermined cycle such as gear teeth, for example.

Meanwhile, a variety of shapes or arrangement positions of the first fixed core, rotary core or armature core can be considered. For example, like a second aspect of the present invention, at least one of the two projecting ends of the first fixed core may be integrally formed with an armature core consisting of wound armature coils formed at a predetermined interval in a peripheral direction of the central axis, and the magnetic flux guide path with a shape varying at predetermined intervals in the winding direction of the superconducting coil may be provided to only a position opposite to the armature core of the rotary core.

By doing so, the magnetic flux generated from the superconducting coil is led out from one of the two projecting ends of the first fixed core and is introduced to the other projecting end of the first fixed core through the projecting end of the rotary core. On the projecting end to which the magnetic flux guide path is not provided, since the magnetic flux passes between the projecting ends of the first fixed core and the projecting ends of the rotary core over the entire circumference, it is possible to expect a stable performance of a thrust bearing. Additionally, since the higher magnetic flux passes through the armature coils at the position opposite to the magnetic flux guide path and an amount of the magnetic flux passing through the armature coils is changed as the rotary core rotates, it is possible to operate the present invention as a dynamotor.

Furthermore, like a third aspect of the present invention, the projecting end attached to the armature core is lengthened in the direction of the central axis, so that it is possible to secure a characteristic of a dynamotor.

By doing so, it is possible to independently design a thrust bearing and a dynamotor.

Meanwhile, instead of integrally constituting the armature core with the first fixed core, it may be possible that a second fixed core is provided on the inside of the rotary core, the armature core is integrally attached to the second fixed core, the rotary core positioned between the first fixed core and the second fixed core and having a function of a magnetic flux path of connecting the first fixed core and the second fixed core is provided and magnetic flux guide paths arranged at intervals in a rotating direction are provided to a surface of the rotary core opposite to the second fixed core.

In other words, like a fourth aspect of the present invention, there is provided a second fixed core that is formed into a cylindrical shape and is arranged fixedly on the inside of the first fixed core so that a central axis thereof coincides with that of the superconducting coil, and the first fixed core is formed so that the opening of U-shape is directed to the inside of the cylindrical shape.

Furthermore, the second fixed core is provided with at least one projecting end to which the armature core is integrally attached, and the rotary core is arranged between the first fixed core and the second fixed core.

Here, the rotary core has, at a surface opposite to the second fixed core, a magnetic flux guide path with a shape varying at predetermined intervals in a rotating direction. The magnetic flux guide path can introduce the magnetic flux, which is generated from the superconducting coil and led out from one of the two projecting ends of the first fixed core, to the projecting end of the second fixed core, and can introduce the magnetic flux led out from the projecting end of the second fixed core to the other projecting end of the first fixed core.

By doing so, the magnetic flux led out from one of the two projecting end of the first fixed core is introduced to the projecting end of the rotary core, passes through the magnetic flux guide path of the rotary core, is introduced to the second fixed core and passes through the armature core.

The magnetic flux introduced to the second fixed core passes through the magnetic flux guide path of the rotary core while passing through the armature core, and is introduced to the other projecting end of the first fixed core from the projecting end.

Like this, in the superconducting magnetic thrust bearing with integrated dynamotor according to the fourth aspect, a magnetic path of the first fixed core—the rotary core—the second fixed core—the rotary core—the first fixed core is formed. The magnetic flux going in and out the second fixed core passes through the armature core.

Since the magnetic flux guide path of the rotary core is made to have a shape varying in a rotating direction at a surface opposite to the second fixed core, the magnetic flux is changed on the surface of the second fixed core opposite to the rotary core as the rotary core rotates. In other words, an amount of the magnetic flux passing through each armature coil of the armature core is changed with time.

In other words, the superconducting magnetic thrust bearing with integrated dynamotor according to the fourth aspect operates as an electric motor. To the contrary, when the rotary core is rotated, the voltages having different phases are generated from the respective armature coils. Hence, the superconducting magnetic thrust bearing can be operated as an electric generator.

Furthermore, when force is applied in a thrust direction of the rotary core, a slight offset occurs to the rotary core in the direction of the central axis. Since a magnetic resistance is generated in the magnetic path by the "offset," there occurs force that returns the rotary core in a direction opposite to the applied force so as to reduce the resistance.

Accordingly, the present invention also functions as a magnetic thrust bearing. At this time, since the superconducting coil is used as a generation source of the magnetic flux, it is possible to generate a very strong magnetic flux. Hence, it is possible to support the very high load as a magnetic thrust bearing.

Further, like a fifth aspect of the present invention, it may be possible that the projecting end of the second fixed core consists of two projecting ends and the armature core is integrally attached to at least one of the two projecting ends of the second fixed core.

In addition, it may be possible that the rotary core has the projecting ends at positions opposite to the two projecting ends of the first fixed core and has, at a position opposite to the projecting end to which the armature core is attached, a magnetic flux guide path with a shape varying at predetermined intervals to be parallel with a direction perpendicular to the central axis.

By doing so, the magnetic flux, which is led out from one of the two projecting ends of the first fixed core, passes through one of the two projecting ends and one of the magnetic flux guide paths of the rotary core and is introduced to one projecting end of the second fixed core.

The magnetic flux guided to one projecting end passes through the cylindrical portion of the second fixed core, is led out from the other projecting end, passes through the other magnetic flux guide path and projecting end of the rotary core, and is introduced to the first fixed core from the other projecting end of the first fixed core. During this, the magnetic flux passes through the armature coils of the armature core.

Like this, there is formed a race track type magnetic path of the projecting end of the first fixed core—the projecting end of the rotary core—the magnetic flux guide path—the projecting end of the second fixed core, the inside and the projecting end of the second fixed core—the projecting end of the rotary core—the magnetic flux guide path—the projecting end of the first fixed core. When the rotary core rotates, an amount of the magnetic flux passing through the armature coils is changed because the guide path has a predetermined cycle in the rotating direction. As a result, it is possible to constitute a dynamotor and a magnetic thrust bearing.

Further, instead of providing the projecting ends to the second fixed core, it may be possible to change the shape of the magnetic flux guide paths of a claw shape provided to the rotary core and arranged in a peripheral direction thereof, like a sixth aspect of the present invention.

The magnetic flux, which is led out from one of the two projecting ends of the first fixed core, is introduced to the rotary core, passes through the armature coils of the armature core, which is integrally attached to a surface opposite to the rotary core of the second fixed core, via the magnetic flux guide path, and is introduced to the second fixed core.

The magnetic flux having passed through the cylindrical portion of the second fixed core passes through the other armature coils of the armature core, enters the other magnetic flux guide path of the rotary core and is led out to the other projecting end via the projecting end.

By doing so, it is possible to alternately change the direction of the magnetic flux passing through the armature coil by the rotary core having the claw-shaped magnetic flux guide path. Accordingly, it is possible to realize a high-efficient superconducting magnetic thrust bearing with integrated dynamotor having a simple structure.

In the meantime, even when the first fixed core is arranged on the inside of the rotary core, rather than the outside thereof, it is possible to realize a high-efficient superconducting magnetic thrust bearing with integrated.

In other words, like a seventh aspect of the present invention, there is provided a second fixed core having a cylindrical shape and arranged fixedly on the outside of the first fixed core so that a central axis thereof coincides with that of the superconducting coil. In addition, the first fixed core may be formed so that the opening of the U-shape is directed to the outside of the cylindrical shape.

Furthermore, it may be possible that the second fixed core is provided with at least one projecting end to which the armature core is integrally attached and the rotary core is arranged between the first fixed core and the second fixed core.

The rotary core has, at a surface opposite to the second fixed core, a magnetic flux guide path with a shape varying at predetermined intervals in a rotating direction, and the magnetic flux guide path introduces magnetic flux, which is generated from the superconducting coil and led out from one of the two projecting ends of the first fixed core, to the projecting end of the second fixed core, and introduces the magnetic flux led out from the projecting end of the second fixed core to the other projecting end of the first fixed core.

In this case, the first fixed core, the rotary core and the second fixed core are sequentially arranged in a radial direction of the superconducting coil. However, the path of the magnetic flux is same as that of the superconducting magnetic thrust bearing with integrated dynamotor according to the fourth aspect.

Furthermore, like an eighth aspect of the present invention, it may be possible that the rotary core has the projecting ends at positions opposite to the projecting ends of the first fixed core and has a pair of magnetic flux guide paths that are arranged in a peripheral direction of the central axis thereof.

In addition, it may be possible that one of the pair of the magnetic flux guide paths forms a magnetic flux guide path that introduces the magnetic flux, which is led out from the one of the two projecting ends of the first fixed core, to the second fixed core, and the other magnetic flux guide path forms a magnetic flux guide path that introduces the magnetic flux, which is led out from the second fixed core, to the other projecting end of the two projecting ends of the first fixed core.

Furthermore, the armature core may be integrally attached to a surface of the second fixed core opposite to the rotary core. By doing so, the first fixed core, the rotary core and the second fixed core are sequentially arranged in a radial direction of the superconducting coil. However, the path of the magnetic flux is same as that of the superconducting magnetic thrust bearing with integrated according to the sixth aspect.

However, even when the rotary core is not arranged between the first fixed core and the second fixed core, it is possible to constitute a superconducting magnetic thrust bearing with integrated.

In other words, like a ninth aspect of the present invention, it may be possible that the first fixed core is formed so that the opening of the U-shape is directed to the inside of the cylindrical shape, and the superconducting coil consists of a pair of superconducting coils that are arranged at a predetermined interval so that the central axes of the windings thereof coincide with each other.

In this case, it is preferable that the second fixed core is formed into a cylindrical shape and is arranged between the superconducting coils in the first fixed core so that the central axis thereof coincides with those of the superconducting coils.

It is preferable that the rotary core is provided with a pair of magnetic flux guide paths arranged in a peripheral direction of the superconducting coils and having a claw shape, and the armature core consisting of a plurality of armature coils is integrally attached to the second fixed core at a surface, opposite to the rotary core, of the second fixed core.

By the above structure, a boundary of the fixed equipment and the rotary equipment can be formed into a simple cylindrical shape, so that it is convenient to design an actual equipment.

The magnetic flux, which is led out from the one of the two projecting ends of the first fixed core, enters the rotary core from the projecting end, passes through one of the pair of magnetic flux guide paths, passes through the armature core and is introduced to the second fixed core. A magnetic flux guide path may be formed in which the magnetic flux, which passes through the other armature core and is led out from the second fixed core, passes through the magnetic flux guide path and the projecting end and is introduced to the other projecting end of the two projecting ends of the first fixed core.

In the above superconducting magnetic thrust bearing with integrated dynamotor, when the current of the same direction is applied to the pair of superconducting coils, the magnetic flux, which is led out from the one of the two projecting ends of the first fixed core, is introduced, at the position opposite to the corresponding projecting end, to the rotary core, passes through the armature core through one of the pair of magnetic flux guide paths, and is introduced to the second fixed core.

The magnetic flux introduced to the second fixed core passes through the cylindrical portion of the second fixed core, passes through the armature core from a portion opposite to the one magnetic flux guide path, and is led out to the rotary core.

The magnetic flux introduced to the rotary core passes through the cylindrical portion of the rotary core and is introduced to the first fixed core at the position opposite to the other projecting end of the two projecting ends of the first fixed core.

Like this, there is formed a magnetic path such as the first fixed core—the rotary core—the second fixed core—the rotary core—the first fixed core. When the magnetic flux passes between the magnetic flux guide path and the second fixed core, it passes through the armature coils of the armature core.

By the above structure, when a rotor rotates, the magnetic flux, which passes through the surface of the second fixed core opposite to the magnetic flux guide path, to which surface the armature core is attached, is changed in the alternate polarities, so that the present invention can be used as an electric generator or dynamotor.

Furthermore, when force is applied in the direction of the central axis of the rotary core, i.e., in the thrust direction, a slight offset occurs to the convex portion of the rotary core and the projecting ends of the first fixed core in the direction of the central axis. Since a magnetic resistance is generated in the magnetic path by the "offset", there occurs force that returns the rotary core in a direction opposite to the applied force so as to reduce the resistance. Accordingly, the present invention also functions as a magnetic thrust bearing.

At this time, since the superconducting coil is used as a generation source of the magnetic flux, it is possible to generate a very strong magnetic flux. Hence, it is possible to support the very high load as a magnetic thrust bearing.

Further, in case of laying stress on a performance as a magnetic thrust bearing, like a tenth aspect of the present invention, it may be possible that the first fixed core is provided with protrusions that are respectively formed in two spaces formed by the pair of superconducting coils and the armature core, over an entire circumference of the first fixed core.

In addition, it may be possible that the rotary core is provided with convex portions at positions opposite to the protrusions.

By doing so, a part of the magnetic flux, which is led out from one of the two projecting ends of the first fixed core and is introduced to one of the pair of projecting ends of the rotary core, enters the protrusions via the convex portions, and the remaining part thereof passes through the rotary core, a magnetic introducing path and the armature core and enters the second fixed core. The magnetic flux, which is introduced to the second fixed core, passes through the armature core and is led out to the other magnetic introducing path of a pair of magnetic introducing paths. The magnetic flux, which is led out to the magnetic introducing path, is introduced to the first fixed core from the projecting end via the other projecting end of the first fixed core. At the same time, the magnetic flux, which is led out from the other protrusion to the convex portion opposite to the corresponding protrusion, joins with the above magnetic flux and is introduced to the first fixed core from the projecting end via the projecting end of the fixed core.

Like this, since the magnetic path in which the magnetic flux is guided between the first fixed core and the rotary core is increased as much as the two protrusions, the thrust force is increased. Hence, it is possible to improve the performance as the magnetic thrust bearing. In other words, it is possible to support the higher thrust load.

EXPLANATION OF REFERENCE NUMERALS 1, 2, 3, 4, 5, 6, 7: superconducting magnetic thrust bearing with integrated dynamotor (magnetic thrust bearing), 10: superconducting coil, 20: fixed core A, 22a, 22b, 32a, 32b, 52a, 52b: projecting end, 24a, 24b: protrusion, 30: rotary core, 36a, 36b: magnetic flux guide path, 38a, 38b: convex portion, 40: armature core, 42: armature coil, 44: slot, 50: fixed core B

BEST MODE FOR CARRYING OUT THE PRESENT INVENTION

Embodiments of the present invention will be explained hereinafter, by way of the drawings. In the meantime, it should be noted that the embodiments of the present invention are not limited to the below embodiments and can adopt a variety of forms as long as they are within the technical scope of the present invention.

First Embodiment (Structure of a Superconducting Magnetic Thrust Bearing 1 with Integrated Dynamotor)

Figure 1A:
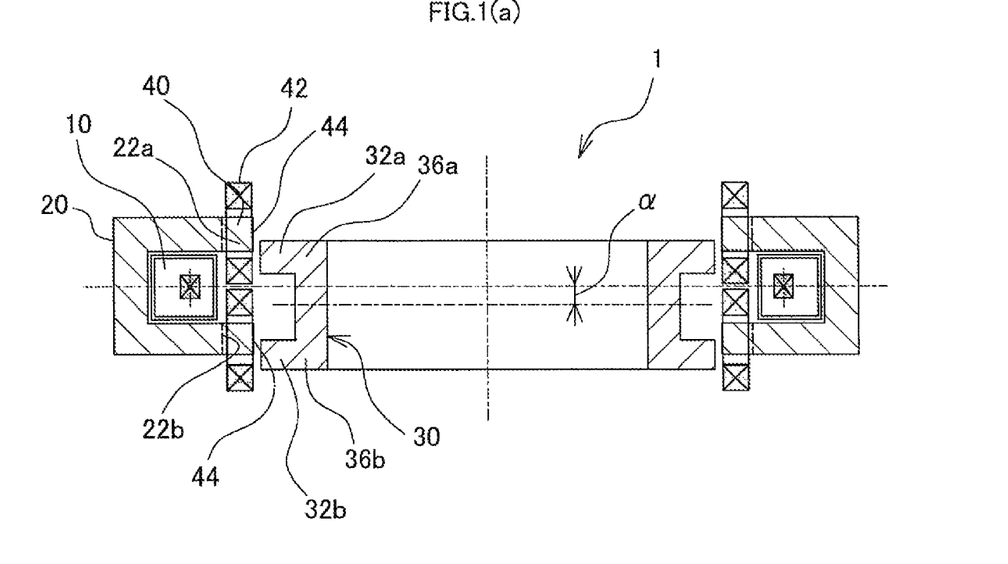
FIG. 1(a) is a sectional view showing a schematic structure of a superconducting magnetic thrust bearing 1 with integrated dynamotor and FIG. 1(b) is a sectional view showing a schematic structure of a superconducting magnetic thrust bearing 2 with integrated dynamotor.

FIG. 1(a) is a sectional view showing a schematic structure of a superconducting magnetic thrust bearing 1 with integrated dynamotor (hereinafter, abbreviated as magnetic thrust bearing 1). The magnetic thrust bearing 1 is provided with a superconducting coil 10, a fixed core A 20, a rotary core 30 and armature cores 40, as shown in FIG. 1(a).

The superconducting coil 10 is composed of superconducting material such as bismuth-based wiring, niobium-titanium wiring and the like and is arranged on the inside of a U-shaped portion of the fixed core A 20 that is formed into a U-shape, as described below.

When the superconducting coil is cooled to a temperature or less with a cooling apparatus not shown, at which the wiring is under superconducting state, and the current is applied from the outside, a strong magnetic flux can be generated.

The fixed core A 20 is formed with ferromagnetic material such as Fe (ferrite) that is formed into a cylindrical shape, and is arranged so that a central axis thereof coincides with that of the superconducting coil 10.

In addition, the fixed core A 20 is formed to have a U-shaped cross-section in a direction of the central axis of the cylindrical shape with an opening of the U-shape being directed perpendicularly to the central axis.

The rotary core 30 is composed of ferromagnetic material such as Fe (ferrite) formed into a cylindrical shape and is arranged on the inside or outside of the fixed core A 20 so that a central axis thereof coincides with that of the superconducting coil 10.

Furthermore, the rotary core 30 has projecting ends 32a, 32b at positions opposite to projecting ends 22a, 22b of the fixed core A 20, and further has magnetic flux guide paths 36a, 36b each with a shape varying in a winding direction of the superconducting coil 10. However, in FIG. 1(a), the projecting ends 32a, 32b and the magnetic flux guide paths 36a, 36b are composed of a same member although they are divided so as to explain the functions thereof.

Further, the rotary core 30 is structured in such a way that it rotates relatively to the fixed core A 20 and can move in the direction of the central axis of the fixed cored A 20.

The armature core 40, which is integrally attached to the projecting ends 22a, 22b of the fixed core A 20, has armature coils 42 that are arranged in the winding direction of the superconducting coil 10.

To be more specific, the armature core 40 comprises armature coils wound on slots 44 for winding armatures formed at predetermined intervals in the peripheral direction of the central axis at the two projecting ends 22a, 22b of the fixed core A 20.

In addition, the armature core 40 is arranged at the position of introducing the magnetic flux led out from the fixed core A 20 to the rotary core 30 and introducing the magnetic flux led out from the rotary core 30 to the fixed core A 20, i.e., in the middle of the magnetic path formed by the fixed core A 20 and the rotary core 30, and the introduced/led out magnetic flux passes through the armature core.

(Operations and Characteristics of the Superconducting Magnetic Thrust Bearing 1 with Integrated Dynamotor)

With the superconducting magnetic thrust bearing 1 with integrated dynamotor, when current is clockwise applied to the superconducting coil 10, seen from the top of FIG. 1(a), the magnetic flux generated from the superconducting coil 10 passes through the magnetic path formed by the fixed core A 20 of U-shape and is led out from one projecting end 22a of the two projecting ends 22a, 22b of U-shape to the outside. The magnetic flux led out from the projecting end 22a to the outside is introduced, at a position opposite to the projecting end 22a, to the projecting end 32a, i.e., the magnetic guide path 36a of the rotary core 30.

The magnetic flux introduced to the projecting end 32a of the rotary core 30 passes through the rotary core 30, is guided to a position opposite to the other projecting end 22b of the two projecting ends 22a, 22b of the fixed core A 20 and is led out, at the position opposite to the other projecting end 22b, from the projecting end 32b, i.e., magnetic flux guide path 36b of the rotary core 30 to the fixed core A 20.

Thus, between the fixed core A 20 and the rotary core 30, there is formed a magnetic path such as the projecting end 22a of the fixed core A 20—the projecting end 32a of the rotary core 30—the magnetic flux guide path 36a—the rotary core 30—the projecting end 32b of the rotary core 30—the magnetic flux guide path 36b—the projecting end 22b of the fixed core A 20.

Since the projecting ends 32a, 32b of the rotary core 30 have the function of the magnetic flux guide paths 36a, 36b, they have a shape that is varied at intervals in the rotating direction. Due to this, as the rotary core 30 rotates, an amount of the magnetic flux passing through the armature coils 42 is changed. Thereby, when the power is extracted from the armature coil, the present invention functions as an electric generator, and when the in-phase current is supplied to the armature coil, the present invention functions as an electric motor.

Furthermore, when force is applied in the direction of the central axis of the rotary core 30, i.e., in the thrust direction, a slight offset α occurs to the rotary core 30 in the direction of the central axis. Since a magnetic resistance of the magnetic path is increased by the offset α, there occurs force that returns the rotary core 30 in a direction opposite to the applied force so as to reduce the resistance. Accordingly, the present invention also functions as a magnetic thrust bearing.

At this time, since the superconducting coil 10 is used as a generation source of the magnetic flux, it is possible to generate a very strong magnetic flux. Hence, it is possible to support the very high load as a magnetic thrust bearing.

As described above, the superconducting coil 10, the fixed core A 20, the rotary core 30 and the armature core 40 are integrated, so that it is possible to realize a superconducting magnetic thrust bearing with integrated dynamotor in which a dynamotor and a magnetic thrust bearing are integrated in a simplified structure.

Further, since the armature core 40 is integrally attached to the two projecting ends 22a, 22b of the fixed core A 20 and the armature coils 32 are wound on the armature core, the magnetic flux, which is led out from one of the projecting ends 22a, 22b of the fixed core A 20 and is introduced to the other projecting end 22b of the fixed core A through the rotary core, passes through the armature coil 42.

In addition, since the magnetic flux, which is introduced or led from the two projecting ends 22a, 22b of the fixed core A 20, is introduced or led to the rotary core 30 from the projecting ends 32a, 32b of the rotary core 30, the strong thrust force can be generated at the corresponding part.

According to the present structure, it is possible to constitute, as a fixed equipment, the superconducting coil 10 which requires power supply and cooling and the armature core 40 which requires the input or output of power. In other words, since it is not necessary to constitute the superconducting coil and the armature core as a rotary body, it is not required to provide a complicated electric equipment, such as a cooling apparatus for cooling the rotary body or a slip ring for inputting and outputting power to and from the rotary body.

Second Embodiment

In the followings, a superconducting magnetic thrust bearing 2 with integrated dynamotor (hereinafter, abbreviated as magnetic thrust bearing 2) according to a second embodiment will be described on the basis of FIG. 1(b). Meanwhile, the magnetic thrust bearing 2 has many constitutional elements common to those of the magnetic thrust bearing 1 of the first embodiment. Hence, the common constitutional elements are denoted as the same reference numerals and the descriptions thereof will not be repeated. In other words, the structures different from the magnetic thrust bearing 1 of the first embodiment will be mainly described.

Figure 1B:
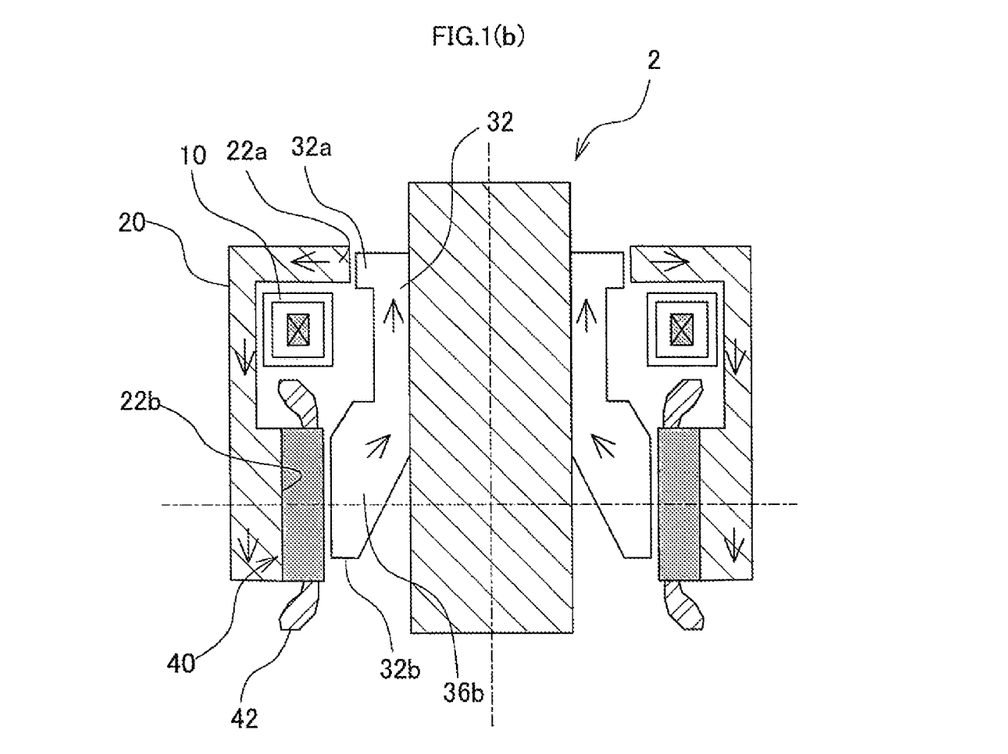

As shown in FIG. 1(b), the magnetic thrust bearing 2 is constituted in such a way that the two projecting ends 22a, 22b of the fixed cord A 20 are opposite to the projecting ends 32a, 32b of the rotary core 30, respectively.

The projecting ends 32b of the projecting ends 32a, 32b of the rotary core 30, which is opposite to the projecting end 22b, which has a longer length in the direction of the central axis, of the two projecting ends 22a, 22b of the fixed core A 20, is formed in such a way that a length thereof in the direction of the central axis is longer than that of the other projecting end 32a. Only the longer projecting end 32b is provided with the function of the magnetic flux guide path 36b with a shape varying in a peripheral direction. Further, the armature core is integrally attached to the longer projecting end 22b only.

According to the above superconducting magnetic thrust bearing 2 with integrated dynamotor, the magnetic flux is led out from the one projecting end 22a of the two projecting ends 22a, 22b of the fixed core A 20, enters the rotary core 30 from the projecting end 32a of the rotary core 30 and is introduced to the other projecting end 22b of the fixed core A 20 from the projecting end 32b, i.e., the magnetic flux guide path 36b of the rotary core 30. On the projecting ends 22a, 32a having the shorter lengths, since the magnetic flux passes through between the projecting end 22a of the fixed core and the projecting end 32a of the rotary core over the entire circumstance, it is possible to expect a stable performance of a thrust bearing. Additionally, since the magnetic flux passing through the armature coils 42 is changed as the rotary core 30 rotates, it is possible to secure a function of a dynamotor.

Third Embodiment

Figure 2:
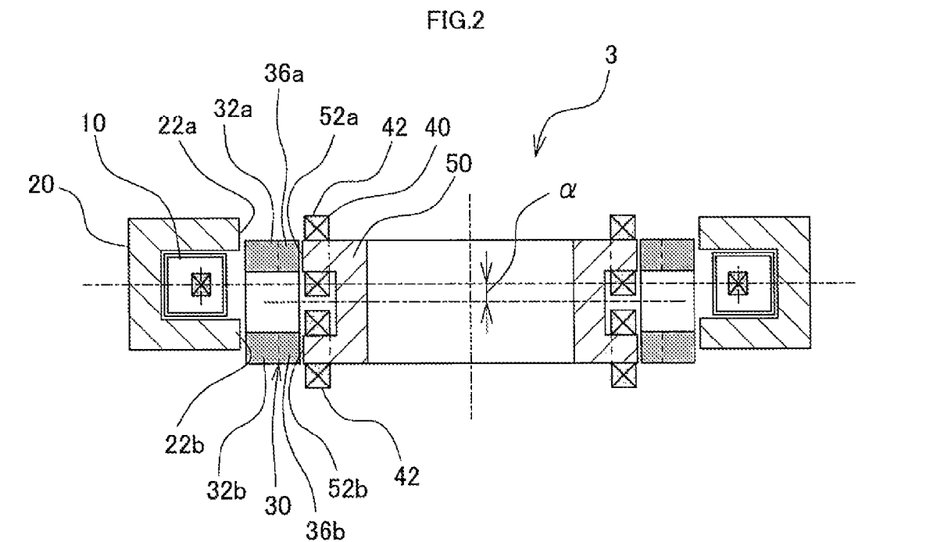
FIG. 2 is a sectional view showing a schematic structure of a superconducting magnetic thrust bearing 3 with integrated dynamotor.

In the followings, a superconducting magnetic thrust bearing 3 with integrated dynamotor (hereinafter, abbreviated as magnetic thrust bearing 3) according to a third embodiment will be described on the basis of FIG. 2. Meanwhile, the magnetic thrust bearing 3 has many constitutional elements common to those of the magnetic thrust bearing 1 of the first embodiment. Hence, the common constitutional elements are denoted as the same reference numerals and the descriptions thereof will not be repeated. In other words, the structures different from the magnetic thrust bearing 1 of the first embodiment will be mainly described.

In the magnetic thrust bearing 3, the fixed core A 20 and a fixed core B 50 are provided so that the rotary core 30 is sandwiched therebetween. The armature cores 40 are integrally attached to projecting ends 52a, 52b of the fixed core B 50, respectively, and are arranged on the inside of the fixed core A 20 so that each central axis thereof coincides with that of the superconducting coil 10.

The rotary core 30 is arranged between the fixed core A 20 and the armature core 40. The rotary core has, at positions opposite to the two projecting ends 22a, 22b of the fixed core A 20, projecting ends 32a, 32b each with a shape not varying in a peripheral direction, and has, at positions opposite to the fixed core B 50, two parallel magnetic flux guide paths 36a, 36b each with a shape varying in the peripheral direction.

The rotary core 30 introduces the magnetic flux, which is generated from the superconducting coil 10 and is led out from the projecting end 22a of the fixed core A 20, from the projecting end 32a, and introduces it to the projecting end 52a of the fixed core A 50 via the magnetic flux guide path 36a. Further, the rotary core introduces the magnetic flux from the projecting end 52b of the fixed core B 50 to the projecting end 32b via the magnetic flux guide path 36b, and then to the projecting end 22b of the fixed core A 20. When the magnetic flux passes through the projecting ends 52a, 52b of the fixed core B 50, it passes through the armature coils 42 of the armature core 40.

In this structure, the projecting ends 32a, 32b of the rotary core 30 are not shaped in such a way that they are changed at intervals in the rotating direction. However, since the magnetic flux guide paths 36a, 36b are shaped in such a way that they are changed at intervals in the rotating direction, an amount of the magnetic flux passing through the armature coils 42 attached to the fixed core B 50 is changed as the rotary core 30 rotates. Accordingly, when the power is extracted from the armature coil, the present invention functions as an electric generator, and when the in-phase current is supplied to the armature coil, the present invention functions as an electric motor.

Furthermore, when force is applied in the thrust direction of the rotary core 30, a slight offset α occurs to the rotary core 30 in the direction of the central axis. Since a magnetic resistance of the magnetic path is increased by the offset α, there occurs force that returns the rotary core 30 in a direction opposite to the applied force so as to reduce the resistance.

Accordingly, the present invention also functions as a magnetic thrust bearing. At this time, since the superconducting coil 10 is used as a generation source of the magnetic flux, it is possible to generate a very strong magnetic flux. Since it is possible to generate a very strong magnetic flux with the superconducting coil 10, it is possible to support the very high load as a magnetic thrust bearing.

Fourth Embodiment

Figure 3:
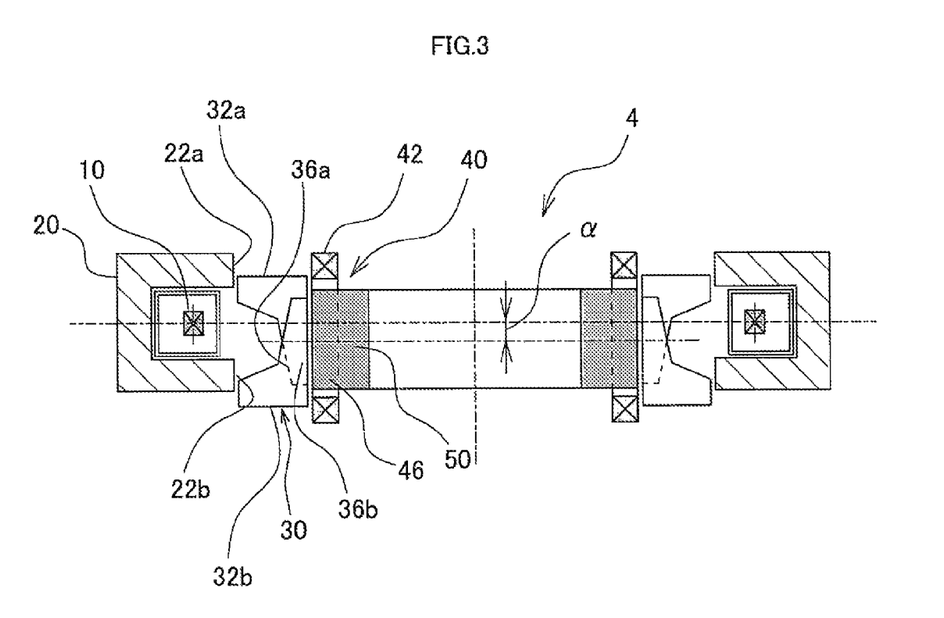
FIG. 3 is a sectional view showing a schematic structure of a superconducting magnetic thrust bearing 4 with integrated dynamotor.

In the followings, a superconducting magnetic thrust bearing 4 with integrated dynamotor (hereinafter, abbreviated as magnetic thrust bearing 4) according to a fourth embodiment will be described on the basis of FIG. 3. Meanwhile, the magnetic thrust bearing 4 has many constitutional elements common to those of the magnetic thrust bearing 3 of the third embodiment. Hence, the common constitutional elements are denoted as the same reference numerals and the descriptions thereof will not be repeated. In other words, the structures different from the magnetic thrust bearing 3 of the third embodiment will be mainly described.

In the magnetic thrust bearing 4, the fixed core B 50 is not provided with the projecting ends 52a, 52b and the armature core 40 is integrally attached to a surface of the fixed core B 50 opposite to the rotary core 30.

In addition, the magnetic flux guide paths 36a, 36b of the rotary core 30 have a claw shape combined in a peripheral direction so that each can guide the magnetic flux to a position opposite to the armature core 40.

The one magnetic flux guide path 36a of the two magnetic flux guide paths 36a, 36b forms a magnetic flux guide path so as to introduce the magnetic flux, which is led out from one projecting end 22a of the two projecting ends 22a, 22b of the fixed core A 20 and then introduced to the rotary core 30 from the projecting end 32a, to the fixed core B 50. The other magnetic flux guide path 36b forms a magnetic flux guide path that introduces the magnetic flux, which is led out from the fixed core B 50, to the other projecting end 22b of the two projecting ends 22a, 22b of the fixed core A 20 via the projecting end 32b. When the magnetic flux comes and goes between the magnetic flux guide paths 36a, 36b and the fixed core B 50, it passes through the armature coils of the armature cores 40.

According to the above superconducting magnetic thrust bearing 4 with integrated dynamotor, since the direction of the magnetic flux introduced to the fixed core B 50 is periodically changed as the rotary core 30 rotates, it is possible to make a high-efficient superconducting magnetic thrust bearing with integrated dynamotor having a simple structure.

Fifth Embodiment

In the followings, a superconducting magnetic thrust bearing 5 with integrated dynamotor (hereinafter, abbreviated as magnetic thrust bearing 5) according to a fifth embodiment will be described on the basis of FIG. 4. Meanwhile, the magnetic thrust bearing 5 has many constitutional elements common to those of the magnetic thrust bearing 4 of the fourth embodiment. Hence, the common constitutional elements are denoted as the same reference numerals and the descriptions thereof will not be repeated. In other words, the structures different from the magnetic thrust bearing 4 of the fourth embodiment will be mainly described.

Figure 4:
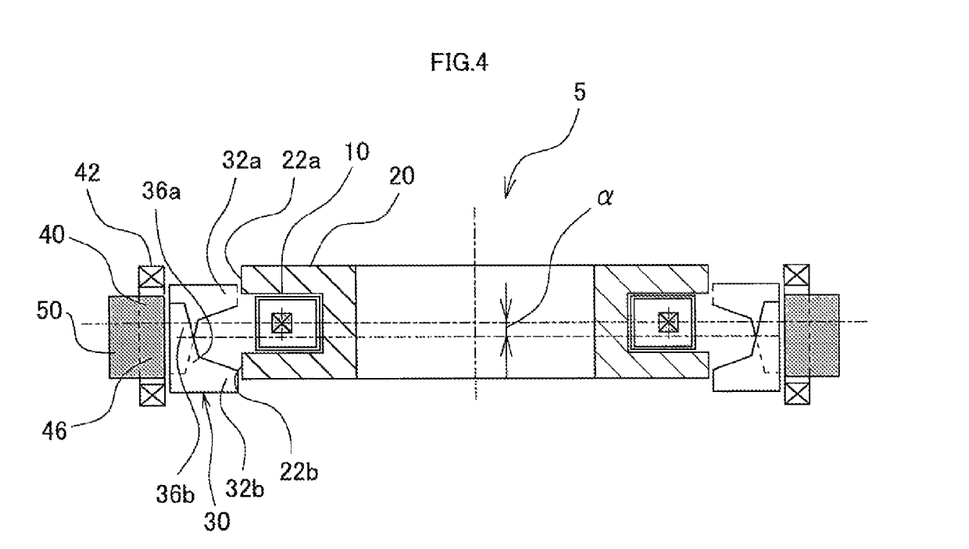
FIG. 4 is a sectional view showing a schematic structure of a superconducting magnetic thrust bearing 5 with integrated dynamotor

As shown in FIG. 4, in the magnetic thrust bearing 5, a U-shaped opening of the fixed core A 20 is formed toward the outside of the cylindrical shape thereof and the superconducting coil 10 is arranged on the inside of the opening.

In addition, the rotary core 30 is arranged at the outside of the fixed core A 20 and the fixed core B 50 is arranged at the further outside. Basically, the functions of the respective constitutional elements are the same as above.

According to the above superconducting magnetic thrust bearing 5 with integrated dynamotor, when a diameter as the dynamotor is same, it is possible to reduce a diameter of the superconducting coil 10 and to increase the number of polarities of the armature core 40. Depending on the characteristics required for each of the dynamotor and the thrust bearing and the using conditions thereof, it is may be determined to select which bearing.

Sixth Embodiment

In the followings, a superconducting magnetic thrust bearing 6 with integrated dynamotor (hereinafter, abbreviated as magnetic thrust bearing 6) according to a sixth embodiment will be described on the basis of FIG. 5. Meanwhile, the magnetic thrust bearing 6 has many constitutional elements common to those of the magnetic thrust bearing 4 of the fourth embodiment. Hence, the common constitutional elements are denoted as the same reference numerals and the descriptions thereof will not be repeated. In other words, the structures different from the magnetic thrust bearing 4 of the fourth embodiment will be mainly described.

Figure 5:
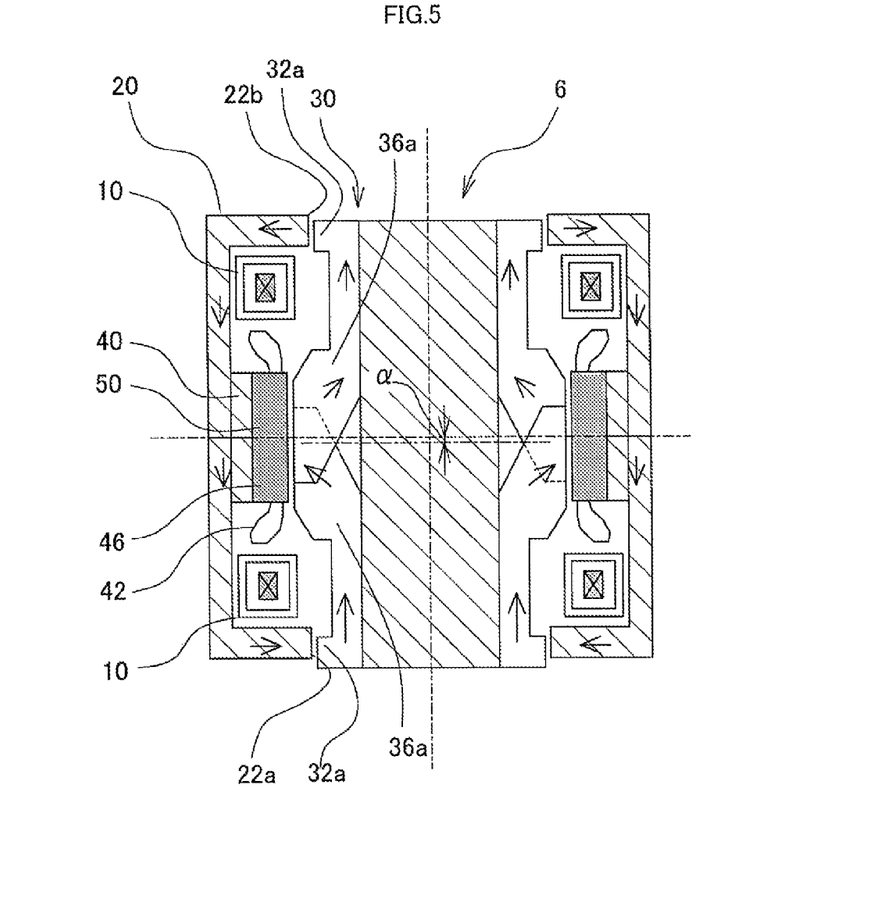
FIG. 5 is a sectional view showing a schematic structure of a superconducting magnetic thrust bearing 6 with integrated dynamotor.

As shown in FIG. 5, in the magnetic thrust bearing 6, a pair of superconducting coils 10 are arranged on the inside the fixed core A 20 at a predetermined interval, which has a U-shaped opening formed toward the inside of the cylindrical shape thereof, so that the central axes of the windings of the coils coincide with each other.

The fixed core B 50 is formed into a cylindrical shape and is arranged between the superconducting coils 10 in the fixed core A 20 so that the central axis thereof coincides with those of the superconducting coils 10.

The rotary core 30 has the magnetic flux guide paths 36a, 36b each with a shape varying in the peripheral directions of the central axes of the superconducting coils 10. The one magnetic flux guide path 36a of the magnetic flux guide paths 36a, 36b forms a magnetic path that leads out the magnetic flux, which is introduced from the one projecting end 22a of the two projecting ends 22a, 22b of the fixed core A 20 via the projecting end 32a of the rotary core 30, to the fixed core B 50, and the other magnetic flux guide path 36a forms a magnetic path that introduces the magnetic flux, which is led out from the fixed core B 50, to the other projecting end 22b of the two projecting ends 22a, 22b of the fixed core A 20 via the projecting end 32b of the rotary core 30.

With the above superconducting magnetic thrust bearing 6 with integrated dynamotor, when the current of the same direction is applied to the pair of superconducting coils 10, the magnetic flux, which is led out from the one projecting end 22a of the two projecting ends 22a, 22b of the fixed core A 20, is introduced, at the position opposite to the projecting end 22a, to the one magnetic flux guide path 36a of the pair of magnetic flux guide paths 36a, 36b via the projecting end 32a of the rotary core 30.

The introduced magnetic flux is introduced to the fixed core B 50, enters the rotary core 30 via the one magnetic flux guide path 36b of the magnetic flux guide paths 36a, 36b and is introduced from the projecting end 32b of the rotary core 30 to the fixed core A 20 at the position opposite to the other projecting end 22b of the fixed core A 20.

As above, there is formed a magnetic path such as the fixed core A 20—the rotary core 30—the fixed core B 50—the rotary core 30—the fixed core A 20. When the magnetic flux goes in and out the fixed core B 50, it passes through the armature coils 42 of the armature core 40.

When the rotary core 30 rotates, the amount and direction of the magnetic flux, which goes in and out at the positions opposite to the magnetic flux guide paths 36a, 36b of the fixed core B 50, are changed. Hence, when the power is extracted from the armature core, the present invention functions as an electric generator, and when the in-phase current is supplied to the armature core 40, the present invention functions as an electric motor.

Furthermore, when force is applied in the central axis direction of the rotary core 30, i.e., in the thrust direction, a slight offset α occurs to the rotary core 30 in the direction of the central axis. Since a magnetic resistance of the magnetic path is increased by the offset α, there occurs force that returns the rotary core 30 in a direction opposite to the applied force so as to reduce the resistance. Accordingly, the present invention also functions as a magnetic thrust bearing.

At this time, since the superconducting coil 10 is used as a generation source of the magnetic flux, it is possible to generate a very strong magnetic flux. Thus, it is possible to support the very high load as a magnetic thrust bearing.

According to the structure of the magnetic thrust bearing 6, a boundary of the fixed equipment and the rotary equipment can be formed into a simple cylindrical shape, so that it is possible to easily manufacture an actual equipment.

Seventh Embodiment

In the followings, a superconducting magnetic thrust bearing 7 with integrated dynamotor (hereinafter, abbreviated as magnetic thrust bearing 7) according to a seventh embodiment will be described on the basis of FIG. 6. Meanwhile, the magnetic thrust bearing 7 has many constitutional elements common to those of the magnetic thrust bearing 6 of the sixth embodiment. Hence, the common constitutional elements are denoted as the same reference numerals and the descriptions thereof will not be repeated. In other words, the structures different from the magnetic thrust bearing 6 of the fourth embodiment will be mainly described.

Figure 6:
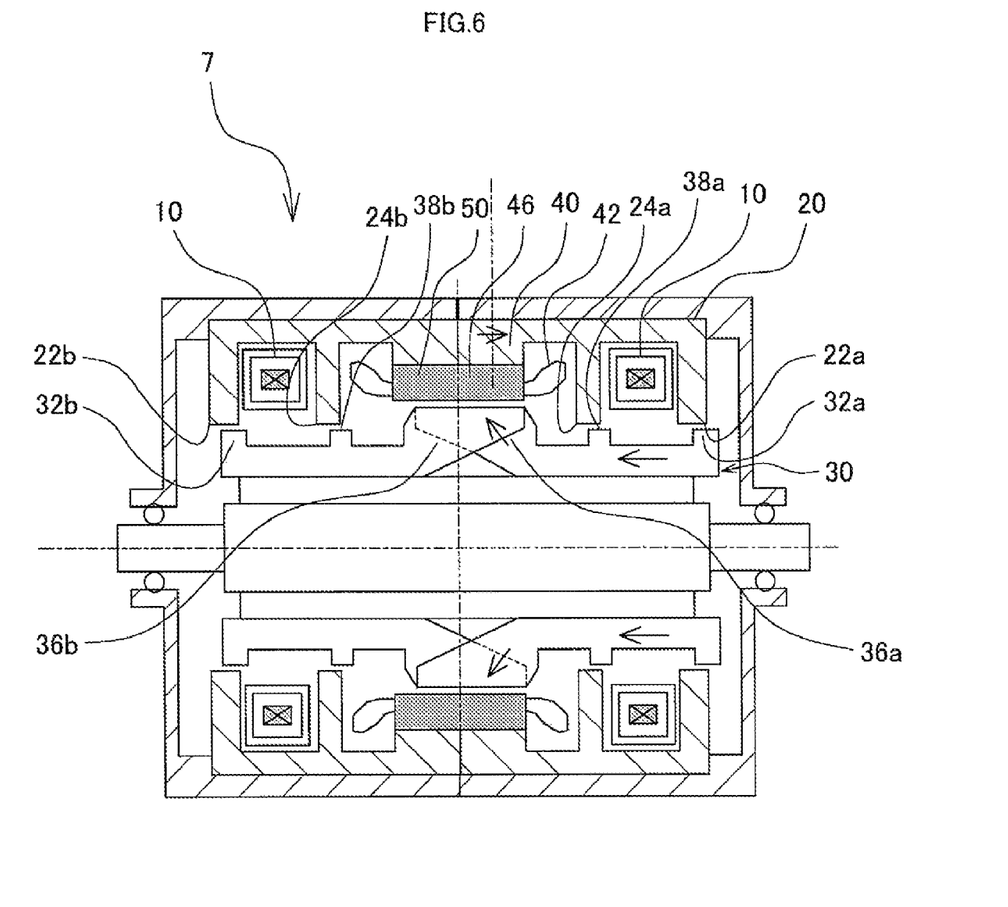
FIG. 6 is a sectional view showing a schematic structure of a superconducting magnetic thrust bearing 7 with integrated dynamotor.

As shown in FIG. 6, in the magnetic thrust bearing 7, the fixed core A 20 is provided with protrusions 24a, 24b that are respectively formed in two spaces, which are formed by the pair of superconducting coils 10, the fixed core B 50 and the armature core 40, over an entire circumference of the fixed core A 20.

Furthermore, the rotary core 30 is provided with convex portions 38a, 38b at positions opposite to the protrusions 24a, 24b of the fixed core A 20.

In the above superconducting magnetic thrust bearing 7 with integrated dynamotor, a part of the magnetic flux, which enters the rotary core 30 from the one projecting end 22a of the two projecting ends 22a, 22b of the fixed core A 20 via the other projecting end 32a of the projecting ends 32a, 32b of the rotary core 30, is introduced to the fixed core B 50 via the one magnetic flux guide path 36a of the pair of magnetic flux guide paths 36a, 36b, and the remaining part is introduced to the one protrusion 24a of the fixed core A 20 from the convex portion 38a opposite to the protrusion 24a.

In addition, the magnetic flux introduced to the fixed core B 50 is led out to the other magnetic flux guide path 36b of the pair of magnetic flux guide paths 36a, 36b and enters the fixed core A 20 from the other projecting end 22b of the fixed core A 20 via the projecting end 32b. Meantime, the magnetic flux, which is introduced from the protrusion 24b to the rotary core 30 via the convex portion 38b, joins with the above magnetic flux and enters the fixed core A 20 from the projecting end 32b via the projecting end 22b of the fixed core.

In other words, in the superconducting magnetic thrust bearing 7 with integrated dynamotor, since the magnetic path in which the magnetic flux is guided between the fixed core A 20 and the rotary core 30 is increased as much as the two protrusions 24a, 24b, the thrust force is increased. Hence, it is possible to improve the performance as the magnetic thrust bearing. In other words, it is possible to support the higher thrust load.

The invention claimed is:

1. A superconducting magnetic thrust bearing with integrated dynamotor comprising:
   a superconducting coil;
   a first fixed core having a cylindrical shape and arranged so that a central axis thereof coincides with that of the superconducting coil;
   a rotary core having a cylindrical shape and arranged on the inside or outside of the first fixed core so that a central axis thereof coincides with that of the superconducting coil; and
   an armature core having a plurality of armature coils arranged in a winding direction of the superconducting coil,
      wherein the first fixed core is formed to have a U-shaped cross-section in a direction of the central axis of the cylindrical shape with an opening of the U-shape being directed perpendicularly to the central axis,
      wherein the superconducting coil is arranged on the inside of the U-shaped portion of the first fixed core formed into the U-shape,
      wherein the rotary core has projecting ends at positions opposite to two projecting ends of the U-shape of the first fixed core, and a magnetic flux guide path, at a position opposite to the armature core, with a shape varying at predetermined intervals in the winding direction of the superconducting coil, and is constituted in such a way that said rotary core rotates relatively to the first fixed core and is able to move in the direction of the central axis of the first fixed core, and
      wherein the armature core is arranged fixedly in a magnetic flux path that introduces a magnetic flux, said magnetic flux is generated from the superconducting coil and led out from one of the two projecting ends of the U-shape of the first fixed core, to the projecting ends of the rotary core and leads out the magnetic flux from the projecting ends of the rotary core.

2. The superconducting magnetic thrust bearing with integrated dynamotor according to claim 1, wherein the first fixed core is formed so that the opening of the U-shape is directed to the inside of the cylindrical shape,
   wherein the armature core is attached to at least one of the two projecting ends of the first fixed core, and
   wherein the rotary core is provided with the projecting ends at the positions opposite to the two projecting ends of the first fixed core and further provided with the magnetic flux guide path, at one of the projecting ends opposite to the armature core, with a shape varying at predetermined intervals in the winding direction of the superconducting coil.

3. The superconducting magnetic thrust bearing with integrated dynamotor according to claim 2, wherein one of the two projecting ends of the first fixed core in the direction of the central axis is formed to be longer than that of the other projecting end,
   wherein one of the projecting ends of the rotary core, which is opposite to the projecting end having the longer length in the direction of the central axis of the two projecting ends of the first fixed core, is formed to have a length in the direction of the central axis longer than that of the other projecting end, and the magnetic flux guide path is provided to the longer projecting end only, and
   wherein the armature core is provided to the projecting end having the longer length in the direction of the central axis of the two projecting ends of the first fixed core.

4. The superconducting magnetic thrust bearing with integrated dynamotor according to claim 1, further comprising a second fixed core having a cylindrical shape and arranged fixedly on the inside of the first fixed core so that a central axis thereof coincides with that of the superconducting coil,
   wherein the first fixed core is formed so that the opening of the U-shape is directed to the inside of the cylindrical shape,
   wherein the second fixed core is provided with at least one projecting end to which the armature core is integrally attached,
   wherein the rotary core is arranged between the first fixed core and the second fixed core and has, at a surface opposite to the second fixed core, a magnetic flux guide path with a shape varying at predetermined intervals in a rotating direction, and
   wherein the magnetic flux guide path introduces the magnetic flux, which is generated from the superconducting coil and led out from one of the two projecting ends of the first fixed core, to the projecting end of the second fixed core, and introduces the magnetic flux led out from the projecting end of the second fixed core to the other projecting end of the first fixed core.

5. The superconducting magnetic thrust bearing with integrated dynamotor according to claim 4, wherein the projecting end of the second fixed core comprises two projecting ends, wherein the armature core is integrally attached to at least one of the two projecting ends of the second fixed core, and wherein the rotary core has the projecting ends at positions opposite to the two projecting ends of the first fixed core and has, at a position opposite to the projecting end to which the armature core is attached, a magnetic flux guide path with a shape varying at predetermined intervals to be parallel with a direction perpendicular to the central axis.

6. The superconducting magnetic thrust bearing with integrated dynamotor according to claim 4, wherein the rotary core has the projecting ends at positions opposite to the projecting ends of the first fixed core and a pair of the magnetic flux guide paths arranged in a peripheral direction of the central axis thereof, and wherein one of the pair of the magnetic flux guide paths forms a magnetic flux guide path that introduces the magnetic flux, which is led out from the one of the two projecting ends of the first fixed core, to the second fixed core, the other magnetic flux guide path forms a magnetic flux guide path that introduces the magnetic flux, which is led out from the second fixed core, to the other projecting end of the two projecting ends of the first fixed core, and the armature core is integrally attached to a surface of the second fixed core opposite to the rotary core.

7. The superconducting magnetic thrust bearing with integrated dynamotor according to claim 1, further comprising a second fixed core having a cylindrical shape and arranged fixedly on the outside of the first fixed core so that a central axis thereof coincides with that of the superconducting coil, wherein the first fixed core is formed so that the opening of the U-shape is directed to the outside of the cylindrical shape, wherein the second fixed core is provided with at least one projecting end to which the armature core is integrally attached, wherein the rotary core is arranged between the first fixed core and the second fixed core and has, at a surface opposite to the second fixed core, a magnetic flux guide path with a shape varying at predetermined intervals in a rotating direction, and wherein the magnetic flux guide path has a magnetic flux introducing path that introduces the magnetic flux, which is generated from the superconducting coil and led out from one of the two projecting ends of the first fixed core, to the projecting end of the second fixed core, and introduces the magnetic flux led out from the projecting end of the second fixed core to the other projecting end of the first fixed core.

8. The superconducting magnetic thrust bearing with integrated dynamotor according to claim 7, wherein the rotary core has the projecting ends at positions opposite to the projecting ends of the first fixed core and has a pair of the magnetic flux guide paths arranged in a peripheral direction of the central axis thereof, and wherein one of the pair of the magnetic flux guide paths forms a magnetic flux guide path that introduces the magnetic flux, which is led out from the one of the two projecting ends of the first fixed core, to the second fixed core, the other magnetic flux guide path forms a magnetic flux guide path that introduces the magnetic flux, which is led out from the second fixed core, to the other projecting end of the two projecting ends of the first fixed core, and the armature core is integrally attached to a surface of the second fixed core opposite to the rotary core.

9. The superconducting magnetic thrust bearing with integrated dynamotor according to claim 1, wherein the first fixed core is formed so that the opening of the U-shape is directed to the inside of the cylindrical shape, wherein the superconducting coil comprises a pair of superconducting coils that are arranged at a predetermined interval so that the central axes of the windings thereof coincide with each other, wherein the second fixed core is formed into a cylindrical shape and is arranged between the superconducting coils in the first fixed core so that the central axis thereof coincides with that of the superconducting coil, and the armature core is integrally attached to a surface opposite to the rotary core, and wherein the rotary core has a pair of magnetic flux guide paths provided at a predetermined interval in a peripheral direction of the central axis of the superconducting coil, and one of the pair of the magnetic flux guide paths forms a magnetic path that introduces the magnetic flux, which is led out from the one of the two projecting ends of the first fixed core, to the second fixed core having the armature core attached thereto, the other magnetic flux guide path forms a magnetic path that introduces the magnetic flux, which is led out from the second fixed core, to the other projecting end of the two projecting ends of the first fixed core.

10. The superconducting magnetic thrust bearing with integrated dynamotor according to claim 9, wherein the first fixed core is provided with protrusions that are respectively formed in two spaces formed by the pair of superconducting coils and the armature core, over an entire circumference of the first fixed core, and wherein the rotary core is provided with convex portions at positions opposite to the protrusions.

* * * * *